United States Patent Office 3,038,150
Patented June 5, 1962

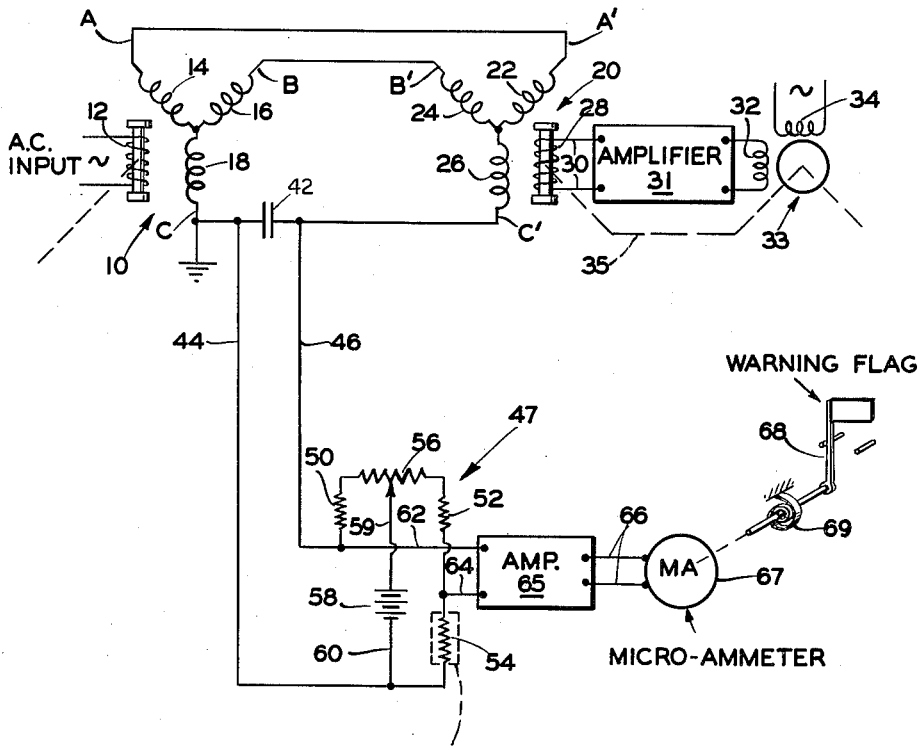

3,038,150
MONITOR CIRCUIT FOR A DATA TRANS-
MISSION SYSTEM
Paul F. Bechberger, Tenafly, N.J., assignor to The Bendix
Corporation, a corporation of Delaware
Filed Feb. 27, 1959, Ser. No. 796,133
4 Claims. (Cl. 340—248)

The invention relates to an improved monitor circuit for a data transmission system and more particularly to a monitoring warning device for use with certain types of A.C. data transmitting systems to supply a warning in case of an open circuit or short circuit in certain of the interconnecting wires.

The invention is particularly adapted for use in an A.C. data transmission system of the type including back-to-back connected synchros and may broadly be applied to a variable induction type transformer system including a transmitter device and receiver device or control transformers, wherein the transmitter and receiver devices are of a conventional type in which three output terminals of each transmitter are connected to three input terminals of a remotely located receiver, and provided furthermore that the function of the system will not be substantially deteriorated by the application of a small D.C. current to the windings of these A.C. devices.

A basic danger in the use of such three wire data transmission systems is that a breakage of one of the three interconnecting wires will in effect result in the transmission of incorrect data. However, in such case since electrical power or error signals may then be still transmitted to the receiver, it is difficult to notice any difference in the operation of the system under such faulty conditions from that under normal operating conditions.

An object of the invention is to provide novel means for providing a warning signal in the event of such a fault in the operating lines between the data transmitting device and the receiving device.

Another object of the invention is to provide a novel fault warning system in which there is provided in one of the three interconnecting leads between the transmitting and receiving devices of the data transmitting system a capacitor of sufficiently low impedance to have negligible effect upon the accuracy of the data system, while opposite sides of the capacitor are connected into a D.C. bridge circuit having output lines controlling some type of warning device such as a micro-ammeter operated warning flag, light, bell or other suitable warning means.

Another object of the invention is to provide novel means for compensating the bridge circuit for changes in the resistance of the windings of the transmitting and receiving devices due to a change in the effective temperature and which changes might otherwise cause the warning device to erroneously indicate a faulty operating condition.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

The drawing is a schematic wiring diagram of a transmitter and receiver, including a novel monitor circuit for providing a warning signal upon a fault therein.

Referring to the drawing there is indicated generally by the number 10 a transmitter synchro or rotary induction transformer having a rotary winding 12 connected across a suitable source of alternating current and inductively coupled to stator windings 14, 16 and 18.

There is further indicated by a numeral 20 a synchro receiver unit or rotary induction transformer having stator windings 22, 24 and 26 and a rotor winding 28 inductively coupled to the stator windings 22, 24 and 26. Conductors 30 lead from the winding 28 so as to apply an output signal through amplifier 31 to a control winding 32 of a two-phase servomotor 33 of conventional type having a fixed phase winding 34. The motor 33 is operatively connected through a follow-up shaft 35 to the rotor of the synchro 20. The position of the rotor winding 28 is adjusted thereby so as to follow the adjusted position of the winding 12 of the transmitter synchro 10 in a conventional manner.

As shown the stator winding 14 is connected by conductors AA' to the stator winding 22 of the receiver synchro 20, while the stator winding 16 of the transmitter synchro 10 is connected by conductors BB' to the stator winding 24 of the receiver synchro 20. The stator winding 18 of the transmitter synchro 10 is connected by a conductor C to one plate of a capacitor 42, while the opposite plate of the capacitor 42 is connected by conductor C' to the stator winding 26 of the receiver synchro 20.

The conductors C and C' at opposite sides of the capacitor 42 and connected to stator windings 18 and 26 are in turn connected through conductors 44 and 46 into a Wheatstone bridge circuit 47, including as opposite arms of the bridge circuit resistors 50, 52 and 54, together with a variable calibrating resistor 56 and a D.C. voltage source 58 connected across input lines 59 and 60 of the bridge circuit 47.

The output of the bridge circuit 47 is connected through conductors 62 and 64 to an input of an amplifier 65 having output lines 66 leading to a micro-ammeter 67 operating a warning flag 68 or other suitable warning device.

The warning flag 68 may be of the type described in Konet et al. U.S. Patent No. 2,664,558, granted December 29, 1955, and assigned to Bendix Aviation Corporation and the arrangement is such that during normal operation of the system the flag 68 may be biased by a suitable spring 69 in a counterclockwise direction to a position at which the flag 68 is hidden from the view of the operator. However, upon a faulty operation of the data transmission system, as hereinafter described, the output signal from the bridge 47 applied across the lines 62 and 64 is sufficient to cause amplifier 65 to operate the micro-ammeter 67 so as to actuate the flag 68 in a clockwise direction to a position in which the flag 68 is visible to the operator so as to indicate a faulty condition of operation.

In the aforenoted arrangement, it will be seen that the bridge 47 may be readily adjusted by the calibrating resistor 56 to a balanced relation relative to the resistance of the windings of the synchros 10 and 20 connected by the lines 44 and 46 so as to provide an arm of the bridge 47. Thus, upon an opening or fault in the circuit AA' or BB' singly or C or C' singly there will be produced a change in the resistance of the synchros 10 and 20 causing the bridge 47 to become unbalanced, whereupon an output voltage is applied across the lines 62—64 which may be amplified through the amplifier 65 so as to operate the warning device 67—68 to warn the operator of the faulty condition. Also, if both circuits AA' and BB' become open the warning device 67—68 will also be brought into operation.

Further, changes in the resistance of the copper windings of the synchros 10 and 20 due to changes in the effective temperature may be compensated in the bridge 47 by providing the resistor 54 of suitable temperature responsive material such as copper having the required positive temperature coefficient of resistance and locating the resistor 54 so as to sense the effective temperature.

In normal practice, the resistance of the stator windings of the receiver synchro 20 will be two or three times greater than the resistance of the stator windings of the transmitter synchro 10. Therefore, changes in the resistance of the controlling bridge arm caused by the effective temperature will be mainly due to changes in the resistance of the stator windings of the receiver synchro 20. In such case, the resistor 54 is most efficaciously located in close proximity to the receiver synchro 20 so as to sense and compensate in the bridge 47 for the changes in the resistance of the stator windings of the receiver synchro 20, otherwise the resultant change in the resistance of such windings may cause the bridge 47 to become unbalanced so as to effect an erroneous indication of a faulty condition of operation.

From the foregoing, it will be seen that there has been provided novel means for detecting a fault in the operating lines of a synchro data transmission system through the insertion of a capacitor 42 into one of the interconnecting lines from the synchro transmitter to the synchro receiver so as to make possible a resistance measurement of the respective synchro windings in the operating circuit. Thus, such resistance measurement provides through the bridge circuit 47 an indication of discontinuity in the data transmitting system due to fault in one or the other of the interconnecting lines, and further, there is provided in the bridge circuit novel means for compensating for changes in the resistance of the operating windings of the respective synchros in such system due to changes in the effective temperature.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. In a data transmission system of a type including an alternating current signal transmitting device and an alternating current signal receiving device, each device including inductive windings, and several electrical conductors to operatively connect said inductive windings of the transmitting device to said inductive windings of the receiving device for transmitting said signals from the transmitting device to the receiving device; the improvement comprising a fault warning system to apply through a part of the data transmission system an electric current having an electrical characteristic substantially different from said alternating current signal, a capacitor connected in one of said electrical conductors to couple the alternating current signal from the transmitting device to the receiving device and to so electrically isolate said data transmission system and said warning system that the electric current of said warning system has negligible effect on the alternating current signal transmitted from the transmitting device to the receiving device, and the warning system including a normally balanced electrical network having an electrical input and an electrical output, a direct current source of electrical energy operably connected to said input, other electrical conductors leading from opposite sides of said capacitor to electrically connect a part of the data transmission system into the normally balanced electrical network, said part including said inductive windings of each of said devices and said several electrical conductors, and fault warning means connected to the electrical output of said normally balanced electrical network to be rendered operative upon the electrical output becoming effective by an unbalancing of the network due to a discontinuity arising in that part of the data transmission system electrically connected in said normally balanced electrical network.

2. In a data transmission system of a type including an alternating current signal transmitting device and an alternating current signal receiving device, each device including a variable three phase induction transformer having three windings electrically connected together and variably inductively coupled to another winding, and several electrical conductors to operatively connect said three inductive windings of the transmitting device to said three inductive windings of the receiving device for transmitting said signals from the transmitting device to the receiving device; the improvement comprising a fault warning system to apply through a part of the data transmission system an electric current having an electrical characteristic substantially different from said alternating current signal, a capacitor connected in one of said electrical conductors to couple the alternating current signal from the transmitting device to the receiving device and to so electrically isolate said data transmission system and said warning system that the electric current of said warning system has negligible effect on the alternating current signal transmitted from the transmitting device to the receiving device, and the warning system including a normally electrically balanced Wheatstone bridge having an electrical input and an electrical output, a direct current source of electrical energy operably connected to said input, other electrical conductors leading from opposite sides of said capacitor to electrically connect a part of the data transmission system into an arm of the normally electrically balanced Wheatstone bridge, said part including said three inductive windings of each of said devices and said several electrical conductors for transmitting said signals from the transmitting device to the receiving device, and fault warning means connected to the electrical output of said normally electrically balanced Wheatstone bridge, said fault warning means being rendered operative upon an unbalancing of the bridge due to a fault in that part of the data transmission system electrically connected in said normally balanced bridge.

3. In a data transmission system of the type including an alternating current signal transmitting variable coupling transformer, an alternating current signal receiving variable coupling transformer, and three electrical conductors to operatively connect the signal transmitting transformer to the signal receiving transformer; the improvement comprising a fault warning system to apply through a part of the data transmission system an electric current having an electrical characteristic substantially different from said alternating current signal, a capacitor connected in one of said electrical conductors to couple the alternating current signal from the transmitting device to the receiving device and to so electrically isolate said data transmission system and said warning system that the electric current of said warning system has negligible effect on the alternating current signal transmitted from the transmitting device to the receiving device, and the warning system including a normally balanced Wheatstone bridge having an electrical input and an electrical output, a direct current source of electrical energy operably connected to said input, other electrical conductors leading from opposite sides of said capacitor to electrically connect a part of the system including windings of the signal transmitting and receiving transformers and the first-mentioned three electrical conductors into a control arm of the normally balanced bridge, and control means operatively connected to the electrical output of said normally balanced electrical bridge, said control means being rendered operative upon a substantial change in the electrical resistance of said part of the system electrically connected in said control arm and effective to electrically unbalance said bridge, and temperature sensitive means positioned in close proximity to at least said signal receiving transformer and operatively connected in another arm of said bridge so as to compensate said bridge for changes in the electrical resistance of said part caused by said sensed temperature so as to effectively prevent said control means from being rendered operative thereby.

4. In a data transmission system of a type including an alternating current signal transmitting device and an alternating current signal receiving device, each device including inductive windings, and several electrical conductors to operatively connect said inductive windings of the transmitting device to said inductive windings of the receiving device for transmitting said signal from the transmitting device to the receiving device; the improvement comprising a fault warning system to apply through a part of the data transmission system an electric current having an electrical characteristic substantially different from said alternating current, means to couple the alternating current signal from the transmitting device to the receiving device and to electrically isolate said data transmission system and said warning system so that the electric current of said warning system has negligible effect on the alternating current signal transmitted from the transmitting device to the receiving device, and the warning system including a normally balanced electrical network having an electrical input and an electrical output, a source of electrical energy having a current characteristic different from said alternating current signal and operably connected to said input, other electrical conductors leading from opposite sides of said coupling and isolating means so as to electrically connect a part of the data transmission system, including said several electrical conductors and the inductive windings electrically connected thereby, into the normally balanced electrical network, and control means operatively connected to the electrical output of said normally balanced electrical network, said control means being rendered operative when a fault in said part causes a substantial change in the electrical resistance of that part of the data transmission system electrically connected in said network.

References Cited in the file of this patent
UNITED STATES PATENTS

| | | |
|---|---|---|
| 2,161,603 | Wallace | June 6, 1939 |
| 2,338,872 | Robidoux | Jan. 11, 1944 |
| 2,573,442 | Hines | Oct. 30, 1951 |
| 2,578,455 | Seely | Dec. 11, 1951 |
| 2,664,558 | Konet et al. | Dec. 29, 1953 |
| 2,685,081 | Colyvas | July 27, 1954 |
| 2,909,764 | Chambers | Oct. 20, 1959 |
| 2,912,644 | Makous | Nov. 10, 1959 |